US009076263B2

(12) United States Patent
Houjou

(10) Patent No.: US 9,076,263 B2
(45) Date of Patent: Jul. 7, 2015

(54) IMAGE PROCESSING APPARATUS, PICTURE STYLE CONVERSION METHOD AND STORAGE MEDIUM

(71) Applicant: CASIO COMPUTER CO., LTD., Tokyo (JP)

(72) Inventor: Yoshiharu Houjou, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 58 days.

(21) Appl. No.: 13/929,532

(22) Filed: Jun. 27, 2013

(65) Prior Publication Data

US 2014/0016861 A1    Jan. 16, 2014

(30) Foreign Application Priority Data

Jul. 13, 2012   (JP) .................................. 2012-157821

(51) Int. Cl.
*G06K 9/34* (2006.01)
*G09G 5/02* (2006.01)
*G06T 11/20* (2006.01)
*G06T 11/00* (2006.01)

(52) U.S. Cl.
CPC ................. *G06T 11/20* (2013.01); *G06T 11/00* (2013.01)

(58) Field of Classification Search
USPC ............ 382/128, 162, 164, 254; 345/22, 589, 345/700; 348/61, 79, E7.085
See application file for complete search history.

(56) References Cited

U.S. PATENT DOCUMENTS

| 6,356,274 | B1* | 3/2002 | Spector | 345/589 |
|---|---|---|---|---|
| 2002/0075292 | A1* | 6/2002 | Spector | 345/700 |
| 2007/0159493 | A1* | 7/2007 | Spector | 345/589 |
| 2012/0026116 | A1 | 2/2012 | Kashio et al. | |

FOREIGN PATENT DOCUMENTS

JP    2012-033011 A    2/2012

* cited by examiner

*Primary Examiner* — Sheela Chawan
(74) *Attorney, Agent, or Firm* — Holtz, Holtz, Goodman & Chick PC

(57) ABSTRACT

An image processing apparatus includes a line drawing conversion module configured to executes line drawing conversion of a source image, an image conversion module configured to form a plurality of divisional images having geometrical shapes, by connecting lines of a line drawing obtained by the line drawing conversion by the line drawing conversion module, and a coloring module configured to color, in specific colors, areas in the respective divisional images formed by the image conversion module.

14 Claims, 12 Drawing Sheets

IMAGE PROCESSING APPARATUS, PICTURE STYLE CONVERSION METHOD AND STORAGE MEDIUM

CROSS-REFERENCE TO RELATED APPLICATIONS

This application is based upon and claims the benefit of priority from prior Japanese Patent Application No. 2012-157821, filed Jul. 13, 2012, the entire contents of which are incorporated herein by reference.

BACKGROUND OF THE INVENTION

1. Field of the Invention

The present invention relates to an image processing apparatus which converts a picture style of a photographed image, a picture style conversion method for use in the image processing apparatus, and a storage medium.

2. Description of the Related Art

In recent years, attempts have been made to not only display an image photographed by a digital camera as such, but also display such an image by subjecting it to various edits and processes. For example, as disclosed in Jpn. Pat. Appln. KOKAI Publication No. 2012-033011, there has been proposed a technique of converting the picture style of a photographed image to a painting style.

Attention has been paid to a stained glass which is widely used for decorations of windows of churches or European-style buildings. A stained glass is formed by coupling pieces of colored glass by using a rim of lead with an H-shaped cross section, and a picture or a pattern is expressed. Although the stained glass was not popular in the era of modernist architecture, it has revived in recent years because the stained glass is seen very beautiful by transmissive light from the outside, and the stained glass has now been adopted in public buildings and houses.

However, an actual stained glass requires a window, and also requires much labor and cost. This being the case, there has been a demand for a technique by which a favorite photo of a user, for example, is processed and used as a stained glass.

BRIEF SUMMARY OF THE INVENTION

The object of the invention is to provide an image processing apparatus which can execute picture style conversion to a stained glass-style image by using an arbitrary image, a picture style conversion method, and a storage medium.

An image processing apparatus according to the invention includes a line drawing conversion module configured to execute line drawing conversion of a source image; an image conversion module configured to form a plurality of divisional images having geometrical shapes, by connecting lines of a line drawing obtained by the line drawing conversion by the line drawing conversion module; and a coloring module configured to color, in specific colors, areas in the respective divisional images formed by the image conversion module.

A picture style conversion method according to the invention includes executing line drawing conversion of a source image; forming a plurality of divisional images having geometrical shapes, by connecting lines of a line drawing obtained by the line drawing conversion; and coloring, in specific colors, areas in the respective divisional images which are formed.

A computer-readable, non-transitory storage medium according to the invention stores a computer program which is executable by a computer, the computer program controlling the computer to execute a line drawing conversion step of executing line drawing conversion of a source image; an image conversion step of forming a plurality of divisional images having geometrical shapes, by connecting lines of a line drawing obtained by the line drawing conversion in the line drawing conversion step; and a coloring step of coloring, in specific colors, areas in the respective divisional images which are formed in the image conversion step.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments will be described hereinafter with reference to the accompanying drawings.

Figure 1:
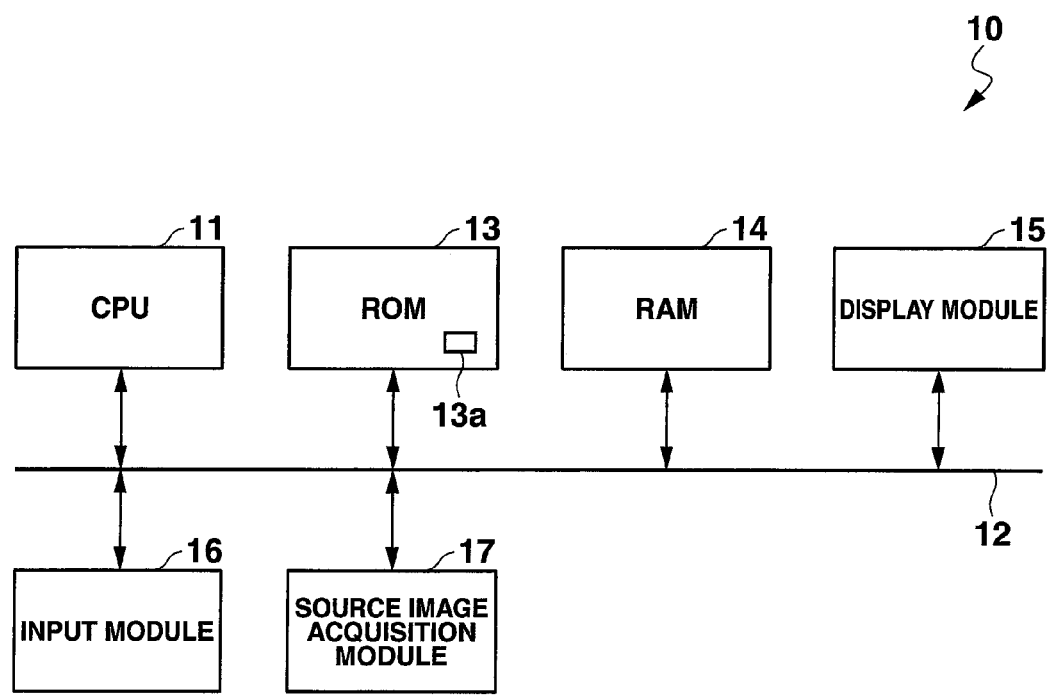
FIG. 1 is a block diagram illustrating the structure of an image processing apparatus according to an embodiment of the invention.
Figure 2:
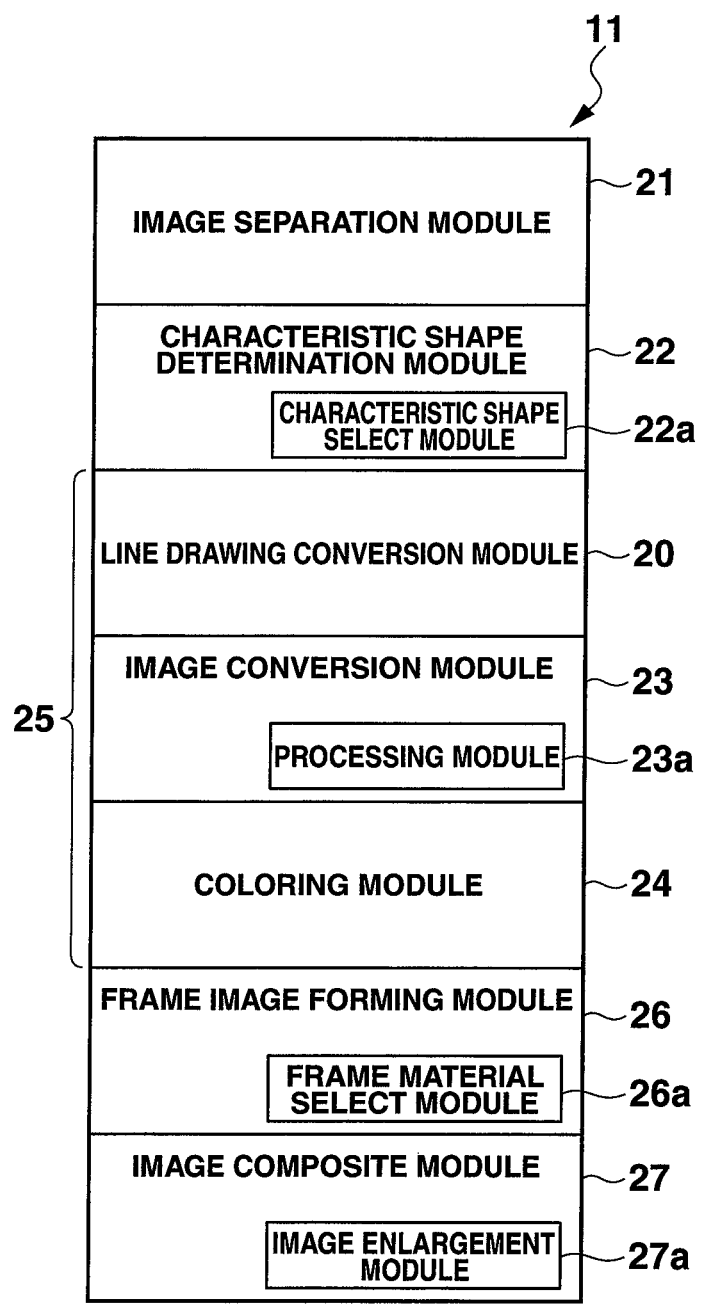
FIG. 2 is a block diagram illustrating a functional configuration of a CPU which is provided in the image processing apparatus in the embodiment.
Figure 3:
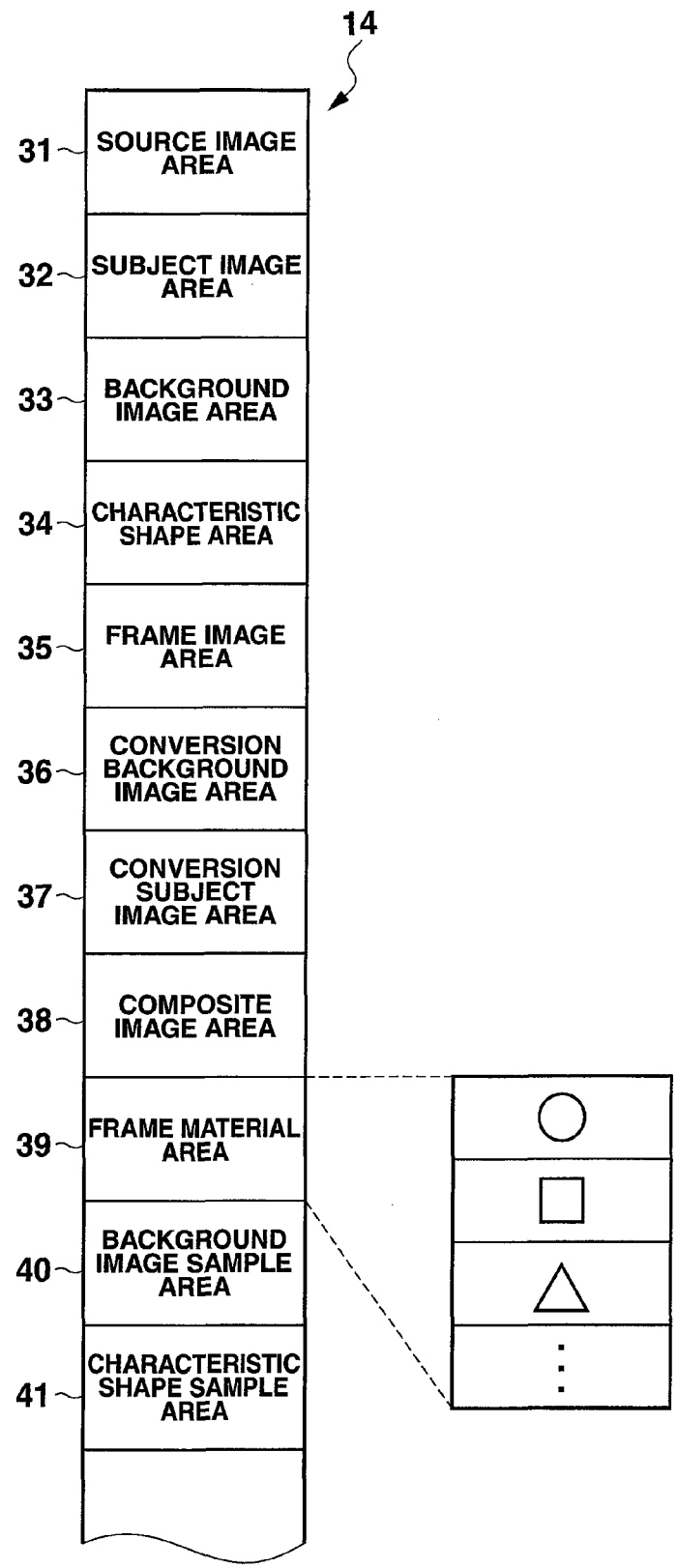
FIG. 3 is a view showing the structure of a work area of a RAM which is provided in the image processing apparatus in the embodiment.

FIG. 1 is a block diagram illustrating the structure of an image processing apparatus according to an embodiment of the invention. Reference numeral 10 in FIG. 1 denotes the entirety of the image processing apparatus. FIG. 2 is a block diagram illustrating a functional configuration of a CPU 11 which is provided in the image processing apparatus 10. FIG. 3 is a view showing the structure of a work area of a RAM 14 which is provided in the image processing apparatus 10.

As illustrated in FIG. 1, the image processing apparatus 10 includes a CPU 11, a ROM 13 which is connected to the CPU 11 via a system bus 12, a RAM 14, a display module 15, an input module 16, and a source image acquisition module 17.

The CPU 11 reads out various programs including an image conversion program 13a from the ROM 13, develops and stores the programs in the RAM 14, and successively executes these programs. As illustrated in FIG. 2, the CPU 11 includes, as functions realized by the image conversion program 13a, an image separation module 21, a characteristic shape determination module 22, a line drawing conversion module 20, an image conversion module 23, a coloring module 24, a frame image forming module 26, and an image composite module 27.

The image separation module 21 separates, from a source image that is a target of conversion, specific images including at least a main subject image. To be more specific, the image separation module 21 separates, from a source image that is a conversion target, a main subject image and a background image excluding the main subject image as specific images.

The characteristic shape determination module 22 determines characteristics shapes of the specific images (subject image and background image) which have been separated from the source image by the image separation module 21. A "characteristic shape" is a characteristic shape of an object appearing in the image. In addition, the characteristic shape determination module 22 includes a characteristic shape select module 22a which selects an arbitrary one of patterns of a plurality of kinds of characteristic shapes which are prepared in advance, in the case where the characteristic shape of the subject image or background image is indeterminable.

The line drawing conversion module 20 executes line drawing conversion of the source image. To be more specific, the line drawing conversion module 20 executes line drawing conversion of the specific image which has been separated from the source image by the image separation module 21. The line drawing conversion module 20, together with the image conversion module 23 and coloring module 24 which are to be described below, constitutes a stained glass conversion module 25.

The image conversion module 23 forms a plurality of divisional images having geometrical shapes, by connecting lines of a line drawing obtained by the line drawing conversion by the line drawing conversion module 20. The "geometrical shapes", in this context, refer to various shapes such as a rectangle, a triangle, a diamond, a polygon, and a circle. In addition, the image conversion module 23 includes a processing module 23a which processes each line of the line drawing, based on the characteristic shape of the specific image.

The coloring module 24 colors, in specific colors, areas in the divisional images formed by the image conversion module 23. Specifically, the coloring module 24 colors each of divisional images formed in the subject image and background image, by a transparent color corresponding to the color of the source image of the divisional image part. A process up to the formation of a plurality of divisional images having geometrical shapes by connecting lines of the line drawing, and the coloring of the divisional images in transparent colors, in the manner as described above, is referred to as "stained glass conversion".

The frame image forming module 26 creates a frame image comprising a plurality of frame materials, based on characteristic shapes of specific images determined by the characteristic shape determination module 22. In addition, the frame image forming module 26 includes a frame material select module 26a which selects an arbitrary one of a plurality of kinds of frame materials which are prepared in advance, when the characteristic shape of the specific image is in determinable. The frame image forming module 26 forms a frame image by arranging frame materials, which have been selected by the frame material select module 26a, in a preset frame area.

The image composite module 27 creates a single stained glass-style image by compositing the specific images after coloring by the coloring module 24 and the frame image created by the frame image forming module 26. In addition, the image composite module 27 includes an image enlargement module 27a which enlarges the subject image by a predetermined magnification. The image composite module 27 composites the background image, the subject image and the frame image in the named order, by using the subject image which has been enlarged by the image enlargement module 27a.

The ROM 13 stores various control programs including the image conversion program 13a for realizing the present invention.

The RAM 14 is used as a work area for storing various data associated with the operation of the CPU 11. As illustrated in FIG. 3, the RAM 14 is provided with a source image area 31, a subject image area 32, a background image area 33, a characteristic shape area 34, a frame image area 35, a conversion background image area 36, a conversion subject image area 37, a composite image area 38, a frame material area 39, a background image sample area 40, and a characteristic shape sample area 41.

The source image area 31 stores a source image acquired by the source image acquisition module 17. The subject image area 32 stores a subject image separated from the source image by the image separation module 21 of the CPU 11. The background image area 33 stores a background image separated from the source image by the image separation module 21 of the CPU 11.

The characteristic shape area 34 stores characteristic shapes of the subject image and background image, which are determined by the characteristic shape determination module 22 of the CPU 11, in such a manner that the characteristic shapes are discriminated with respect to each of image types. The frame image area 35 stores a frame image formed by the frame image forming module 26 of the CPU 11.

The conversion background image area 36 stores a background image after conversion, which is acquired by the stained glass conversion module 25. The conversion subject image area 37 stores a subject image after conversion, which is acquired by the stained glass conversion module 25. The composite image area 38 stores a composite image created by the image composite module 27.

The frame material area 39 stores a plurality of kinds of frame materials for constructing a frame image. Specifically, small pieces of patterns having various shapes, such as a circle, a triangle and a rectangle, are stored as frame materials.

The background image sample area 40 stores samples of a plurality of kinds of background images. The samples of background images are used when a background image cannot be extracted from the source image, or when stained glass conversion of a background image cannot be executed. In addition, the characteristic shape sample area 41 stores samples of a plurality of kinds of characteristic shapes. The samples of characteristic shapes are used when a characteristic shape of an image cannot be discriminated.

Referring back to FIG. 1, the display module 15 is composed of, for example, an LED (light emitting diode), and displays various data such as images. The input module 16 is composed of, for example, a keyboard, a switch, a mouse, a tablet, etc., and is used for an input of various data or an instruction operation by the user.

The source image acquisition module 17 is a unit for acquiring a source image that is a conversion target. As a method of acquiring the source image, for example, use may be made of a method of directly taking in an image which is photographed by a digital camera, a method of reading out an image from recording media, or a method of taking in an image from the outside via a communication network.

Next, the operation of the image processing apparatus 10 in the embodiment is described in detail, with the operation being divided into (a) an entire flow, (b) a characteristic shape determination process, (c) a stained glass conversion process, and (d) a composite process.

(a) Entire Flow

Figure 4:
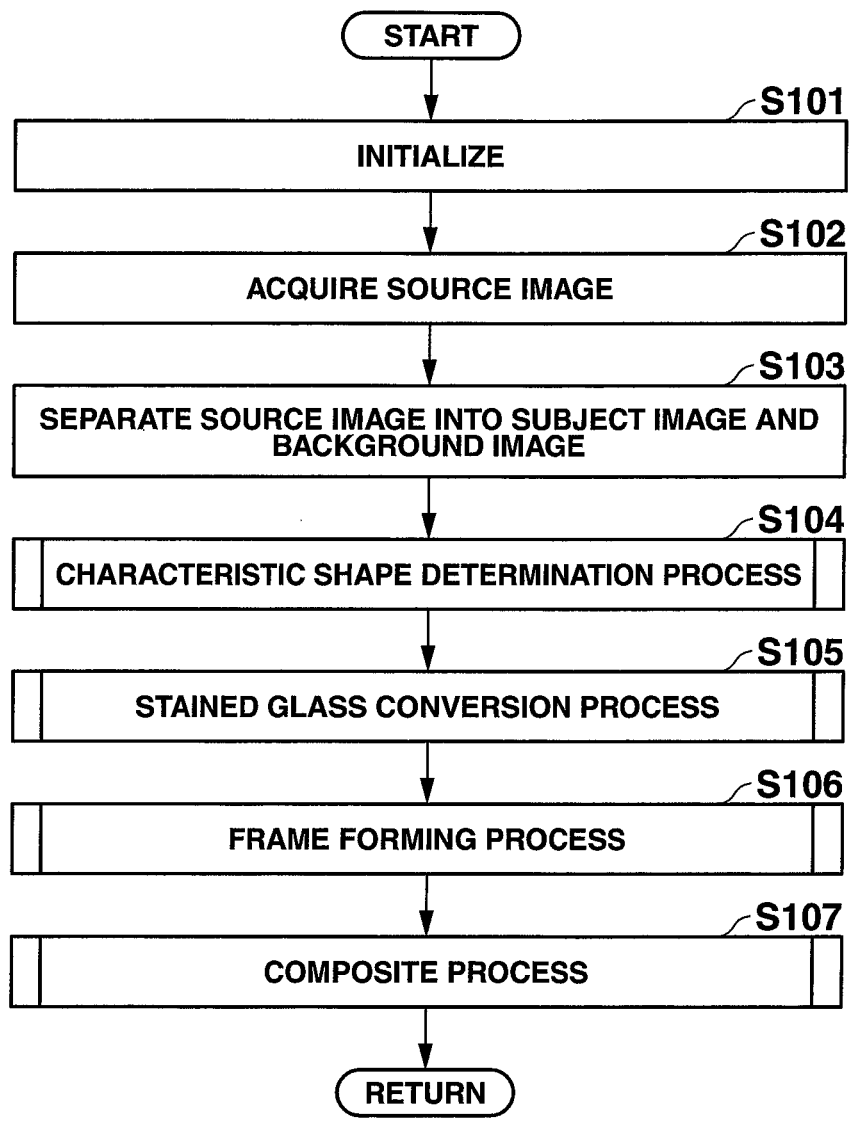
FIG. 4 is a flowchart illustrating a process operation of the image processing apparatus in the embodiment.

FIG. 4 is a flowchart illustrating a process operation of the image processing apparatus 10. FIG. 4 shows the flow of a process for creating a stained glass-style image by using an arbitrary image. The process illustrated in this flowchart is executed by the CPU 11, or a computer, reading in the image conversion program 13a that is stored in the ROM 13.

If a stained glass function of the image processing apparatus 10 is activated by the operation of the input module 16, the CPU 11 executes initialization, such as clearing of the content of the RAM 14 (step S101), and acquires a source image that is a conversion target via the source image acquisition module 17 and stores the source image in the source image area 31 of the RAM 14 (step S102).

If the source image that is the conversion target is obtained, the CPU 11 activates the image separation module 21, and separates the source image stored in the source image area 31 into a subject image and a background image (step S103).

In the meantime, as a method of separation into a subject image and a background image, for example, use may be made of a method of determining an object, which exists at a central part of the source image, to be a main subject image, and cutting out a contour of the object as a trace. In addition, a part corresponding to a subject image may be explicitly designated by a predetermined operation by the user. The subject image and background image, which have been separated by the image separation module 21, are stored as specific images in the subject image area 32 and background image area 33 of the RAM 14, respectively.

Next, the CPU 11 activates the characteristic shape determination module 22, and determines the characteristic shapes of the subject image stored in the subject image area 32 and the background image stored in the background image area 33, respectively (step S104). The characteristic shapes of the subject image and background image, which have been determined by the characteristic shape determination module 22, are stored in the characteristic shape area 34 of the RAM 14, in such a manner that the characteristic shapes are discriminated with respect to each of image types. This process of determining the characteristic shapes will be described later with reference to FIG. 5.

In addition, the CPU 11 activates the stained glass conversion module 25 (line drawing conversion module 20, image conversion module 23 and coloring module 24), executes line drawing conversion of the subject image stored in the subject image area 32 and the background image stored in the background image area 33, forms a plurality of divisional images having geometrical shapes by connecting lines of line drawings obtained by the line drawing conversion, and colors areas in the divisional images in transparent colors (step S105).

As described above, the process from the line drawing conversion to the formation of divisional images to the coloring in transparent colors is referred to as "stained glass conversion". The background image and subject image, which have been converted by the stained glass conversion module 25, are stored in the conversion background image area 36 and conversion subject image area 37 of the RAM 14. This stained glass conversion will be described later with reference to FIG. 6.

In addition, the CPU 11 activates the frame image forming module 26, and forms a frame image surrounding the entire image including the subject image (step S106). The frame image formed by the frame image forming module 26 is stored in the frame image area 35 of the RAM 14. Incidentally, the process of creating the frame image will be described with reference to FIG. 7.

If the background image and subject image after conversion and the frame image are obtained in this manner, the CPU 11 activates the image composite module 27, and composites these images in a predetermined order, thereby creating the composite image as a single stained glass-style image (step S107). The composite image (stained glass-style image) created by the composite module 27 is stored in the composite image area 38 of the RAM 14. Incidentally, this process of creating the composite image will be described later with reference to FIG. 8.

(b) Characteristic Shape Determination Process

Figure 5:
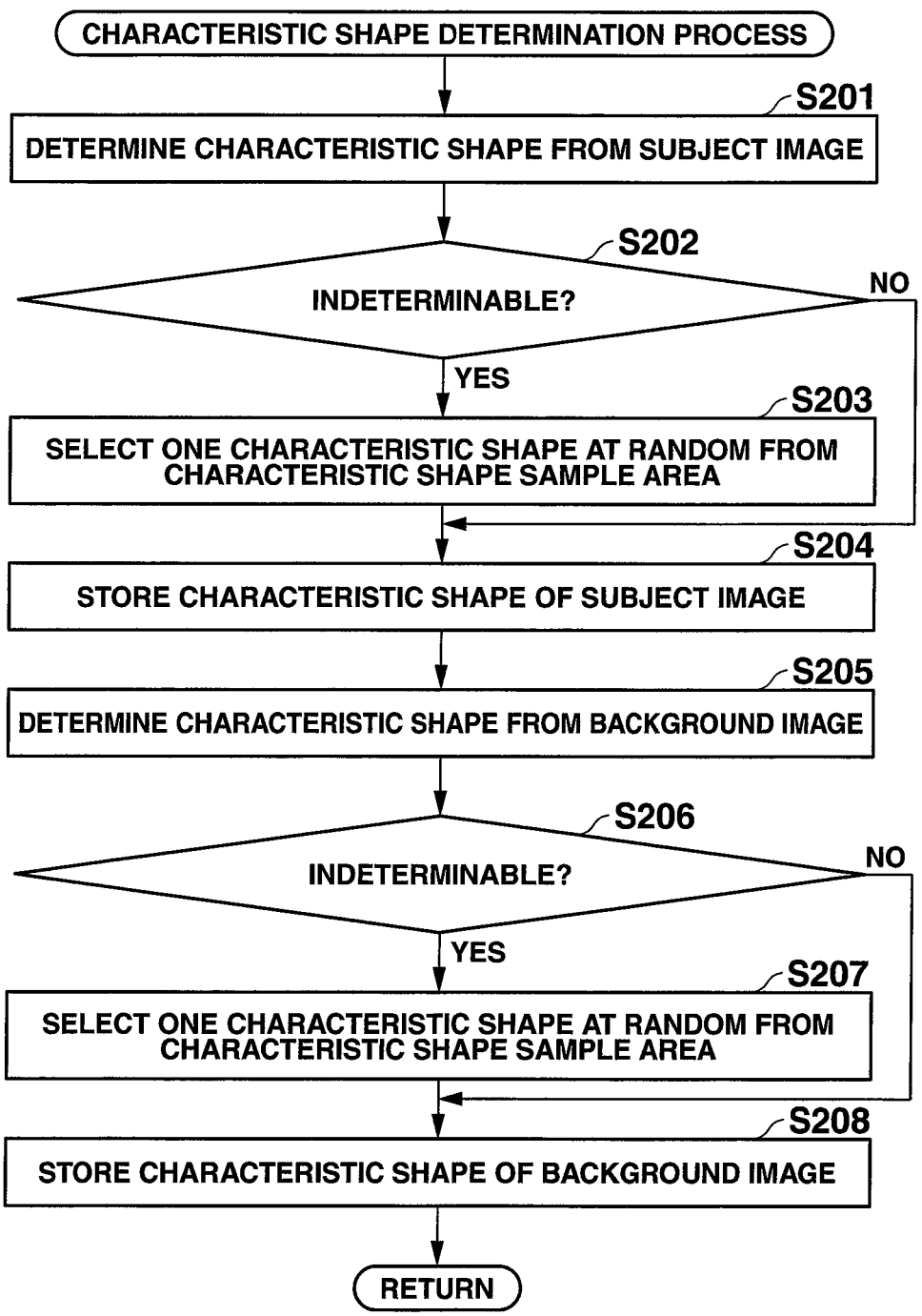
FIG. 5 is a flowchart illustrating an operation of a characteristic shape determination process of the image processing apparatus in the embodiment.

FIG. 5 is a flowchart illustrating the operation of the characteristic shape determination process of the image processing apparatus 10. The process illustrated in this flowchart is executed by the characteristic shape determination module 22 included in the CPU 11 in step S104 of FIG. 4.

To start with, the characteristic shape determination module 22 reads out the subject image, which has been separated from the source image as the specific image, from the subject image area 32 of the RAM 14, and discriminates the characteristic shape of the subject image (step S201). This is achieved by tracing the contour of the subject image. When the contour has failed to be traced, or when the shape could not be specified even if the contour was successfully be traced, the discrimination is determined to be impossible.

When the characteristic shape could not be determined (YES in step S202), the characteristic shape determination module 22 selects one of the patterns of the characteristic shape at random from the characteristic shape sample area 41 of the RAM 14 through the characteristic shape select module 22a (step S203). The characteristic shape determination module 22 stores the characteristic shape, which has been selected from the characteristic shape sample area 41, in the characteristic shape area 34 of the RAM 14 as the characteristic shape of the subject image (step S204).

When the characteristic shape was successfully discriminated (NO in step S202), the characteristic shape determination module 22 stores the characteristic shape in the characteristic shape area 34 of the RAM 14 as the characteristic shape of the subject image (step S204).

The same applies to the background image.

Specifically, the characteristic shape determination module 22 reads out the background image, which has been separated from the source image as the specific image, from the background image area 33 of the RAM 14, and discriminates the characteristic shape of the background image by contour tracing (step S205).

When the characteristic shape could not be determined (YES in step S206), the characteristic shape determination module 22 selects one of the patterns of the characteristic shape at random from the characteristic shape sample area 41 of the RAM 14 through the characteristic shape select module 22*a* (step S207), and stores the selected pattern in the characteristic shape area 34 of the RAM 14 as the characteristic shape of the background image (step S208).

When the characteristic shape was successfully discriminated (NO in step S206), the characteristic shape determination module 22 stores the characteristic shape in the characteristic shape area 34 of the RAM 14 as the characteristic shape of the background image (step S208).

In this manner, the characteristic shapes of the subject image and background image are discriminated and stored in the characteristic shape area 34 of the RAM 14. As will be described later, the characteristic shapes are referred to when divisional images corresponding to pieces of stained glass are formed. In addition, the characteristic shape of the subject image is referred to when the frame of the stained glass is formed.

Besides, although there is a case in which the characteristic shape cannot be discriminated depending on the composition of the subject or background, this case can be coped with by selecting an arbitrary shape from the characteristic shape sample area 41.

(c) Stained Glass Conversion Process

Figure 6:
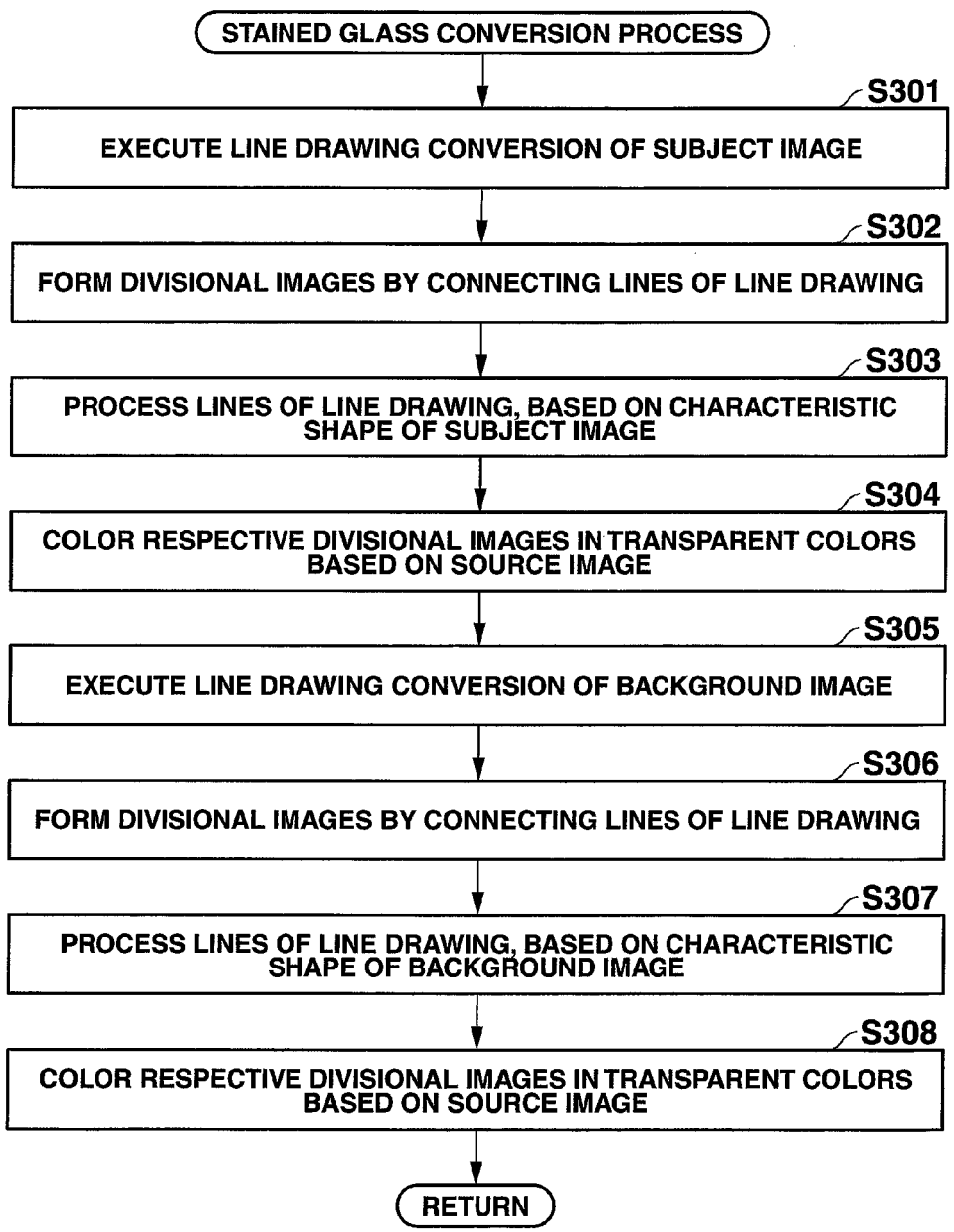
FIG. 6 is a flowchart illustrating an operation of a stained glass conversion process of the image processing apparatus in the embodiment.

FIG. 6 is a flowchart illustrating an operation of the stained glass conversion process of the image processing apparatus 10. The process illustrated in this flowchart is executed in step S105 of FIG. 4 by the stained glass conversion module 25 included in the CPU 11.

The stained glass conversion module 25 is composed of the line drawing conversion module 20, image conversion module 23 and coloring module 24. The line drawing conversion module 20 reads out the subject image, which has been separated from the source image, from the subject image area 32 of the RAM 14, and executes line drawing conversion of the subject image (step S301). The "line drawing conversion" is a method of converting the source image to a line drawing which is represented by only black-and-white contour lines (see FIG. 15). In the meantime, since the method of the line drawing conversion is publicly known, a detailed explanation thereof is omitted here.

The image conversion module 23 forms a plurality of divisional images having geometrical shapes, by connecting lines of line drawing obtained by the line drawing conversion (step S302). The divisional images correspond to small pieces which constitute a stained glass, and are formed by correcting the respective lines of the line drawing in a manner to become closed curves (see FIG. 16). At this time, the image conversion module 23 processes the lines of the line drawing in accordance with the characteristic shape of the subject image through the processing module 23*a* (step S303).

For example, when the characteristic shape of the subject image is a circular shape, the respective lines of the line drawing are slightly curved outward and connected with arcs so as to form divisional images with roundness. When there are many linear shapes, the lines of the line drawing are connected with straight lines. By this processing, a stained glass, in which small pieces with shapes close to the shape of the subject are combined, can be created.

In this manner, if the plural divisional images corresponding to the small pieces of the stained glass are formed by using the lines of the line drawing in the subject image, the coloring module 24 is then activated. The coloring module 24 uniformly colors, in transparent colors, the areas in the respective divisional images (closed-curve areas) formed by the image conversion module 23 (step S304).

In this case, it is assumed that the transparent color corresponding to the color of the source image of the divisional image part is set to be a specific color, and the area of the divisional image is colored. For example, when the color of the source image, which corresponds to the divisional image part, is red, the area of the divisional image is colored in a transparent color corresponding to red. In this manner, by the coloring in the transparent color corresponding to the color of the source image, the stained glass can be formed without greatly changing the color tone of the source image. The subject image, which has been colored in the transparent color for each divisional image, is stored in the conversion subject image area 37 of the RAM 14 as a stained glass-converted subject image.

The same applies to the background image.

Specifically, the image conversion module 23 reads out the background image, which has been separated from the source image, from the background image area 33 of the RAM 14, and executes line drawing conversion of the background image (step S305). The image conversion module 23 forms a plurality of divisional images having geometrical shapes, by connecting lines of line drawing obtained by the line drawing conversion (step S306). At this time, the image conversion module 23 processes the lines of the line drawing in accordance with the characteristic shape of the background image through the processing module 23*a* (step S307).

Subsequently, the coloring module 24 uniformly colors the areas of the respective divisional images (closed-curve areas), which have been formed by the image conversion module 23, in transparent colors corresponding to the colors of the source image of the divisional image part (step S308). The background image, which has been colored in the transparent color for each divisional image, is stored in the conversion background image area 36 of the RAM 14 as a stained glass-converted background image.

(c) Frame Forming Process

Figure 7:
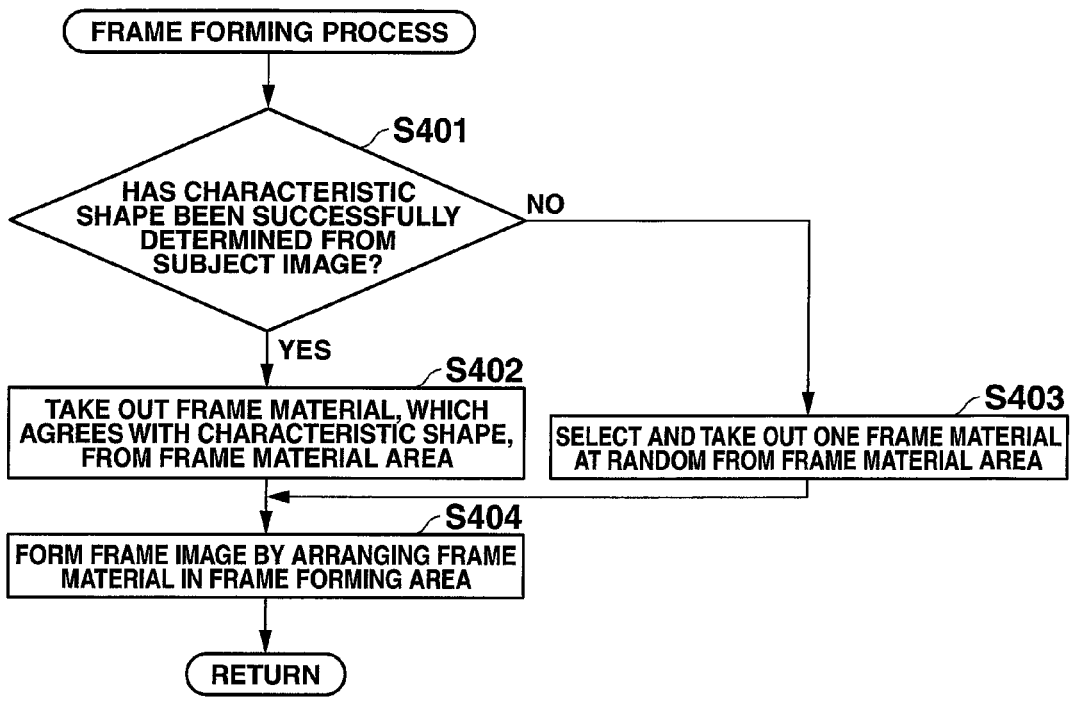
FIG. 7 is a flowchart illustrating an operation of a frame creation process of the image processing apparatus in the embodiment.

FIG. 7 is a flowchart illustrating an operation of the frame forming process of the image processing apparatus 10. The process illustrated in this flowchart is executed by the frame image forming module 26 included in the CPU 11 in step S106 of FIG. 4.

To start with, the frame image forming module 26 determines whether the characteristic shape has been successfully determined from the subject image (step S401). This is achieved by checking whether the characteristic shape of the subject image is stored in the characteristic shape area 34 of the RAM 14. When the characteristic shape has been successfully determined, that is, when the characteristic shape of the subject image is stored in the characteristic shape area 34 (YES in step S401), the frame image forming module 26 takes out a frame material, which agrees with the characteristic shape, from the frame material area 39 of the RAM 14 (step S402).

For example, when the characteristic shape of the subject image is a circular shape, a frame material having a circular shape is taken out from the frame material area 39. The frame image forming module 26 creates a frame image by arranging the frame materials in a frame creation area which is preset around the image (step S404).

On the other hand, when the characteristic shape could not be determined, that is, when the characteristic shape of the subject image is not stored in the characteristic shape area 34

(NO in step S401), the frame image forming module 26 takes out one frame material at random from the frame material area 39 of the RAM 14 through the frame material select module 26a (step S403), and creates a frame image by arranging this frame material in the frame creation area (step S404). The thus created frame image is stored in the frame image area 35 of the RAM 14.

In this manner, when the characteristic shape has been successfully determined from the subject image, the frame material, which agrees with the characteristic shape, is used, whereby a frame image which is suited to the subject image can be created. In addition, even when the characteristic shape could not be determined from the subject image, an arbitrary frame material is selected from the frame material area 39, whereby a frame image can be created.

(d) Composite Process

Figure 8:
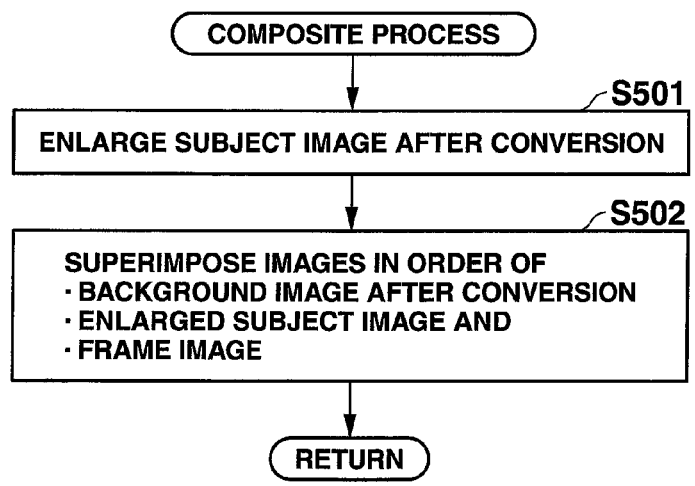
FIG. 8 is a flowchart illustrating an operation of a composite process of the image processing apparatus in the embodiment.

FIG. 8 is a flowchart illustrating an operation of the composite process of the image processing apparatus 10. The process illustrated in this flowchart is executed in step S107 of FIG. 4 by the image composite module 27 included in the CPU 11.

To start with, the image composite module 27 reads out the subject image after conversion from the conversion subject image area 37 of the RAM 14, and enlarges the size of the subject image by a magnification of 110% to 120% through the image enlargement module 27a (step S501).

Specifically, since the subject image and background image are separated from one source image and are subjected to stained glass conversion, it is possible that a gap occurs between images are superimposed after conversion. In order to eliminate such a gap between the images, the size of the subject image is slightly enlarged. In addition, by enlarging the subject image which is a main image, there is an advantage that a stained glass centering on the subject can be obtained.

Subsequently, the image composite module 27 reads out the background image after conversion from the conversion background image area 36 of the RAM 14, reads out the frame image from the frame image area 35, and creates one composite image by combining these images with the enlarged subject image after conversion (step S502).

In this case, the background image after conversion, the subject image after conversion and the frame image are superimposed in the named order. Specifically, the background image after conversion is placed as a lowermost layer. The enlarged subject image after conversion is laid over the background image, and at last the frame image is laid over. By superimposing the images in this order, the composite image with no gap can be obtained as a single stained glass-style image.

The thus created stained glass-style image is stored in the composite image area 38 of the RAM 14, and can be confirmed by the display module 15. In addition, where necessary, the stained glass-style image can be printed out by a printer (not shown), and the print can be attached to a window, etc.

Next, concrete examples are described.

CONCRETE EXAMPLE 1

Figure 9:
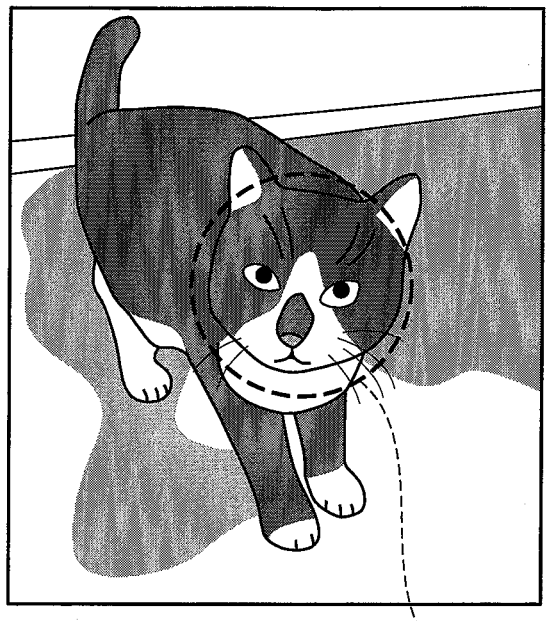
FIG. 9 is a view showing an example of a photographed image in the embodiment.
Figure 10:
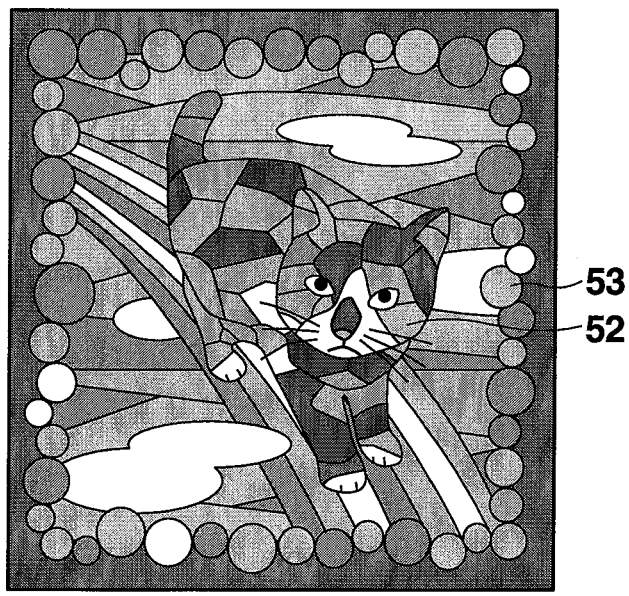
FIG. 10 is a view showing an example of a stained glass conversion image in the embodiment, which is obtained by subjecting the photographed image of FIG. 9 to stained glass conversion.

FIG. 9 is a view showing an example of a photographed image of a cat, and FIG. 10 is a view showing an example of an image which is obtained by stained glass conversion, with the photographed image being used as a source image.

In this example, the cat is a main subject. As indicated by a broken line 51, a "circle" is determined to be the characteristic shape of the subject image, based on such shape recognition that the face and eyes of the cat are circular. Incidentally, the characteristic shape of the background image is not discriminable. In the stained glass conversion, the characteristic shape of the subject image is reflected. As a result, as shown in FIG. 10, a stained glass-style image, in which the subject image is represented by a plurality of small pieces 52 with roundness, is obtained. In addition, the characteristic shape of the subject image is also reflected on the frame image, and a frame material 53 with a circular shape is used.

CONCRETE EXAMPLE 2

Figure 11:
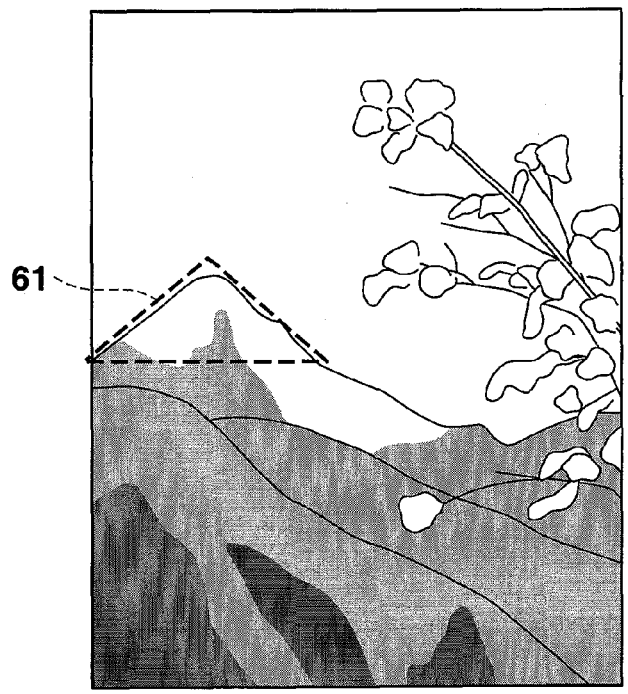
FIG. 11 is a view showing an example of another photographed image in the embodiment.
Figure 12:
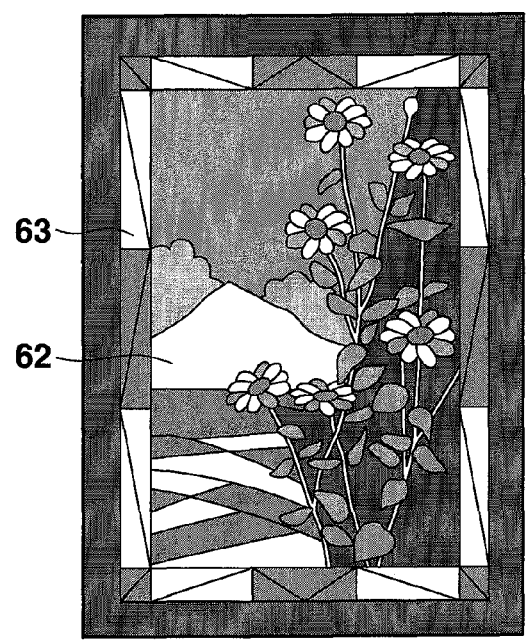
FIG. 12 is a view showing an example of another stained glass conversion image in the embodiment, which is obtained by subjecting the photographed image of FIG. 11 to stained glass conversion.

FIG. 11 is a view showing an example of a photographed image of a mountain, and FIG. 12 is a view showing an example of an image which is obtained by stained glass conversion, with the photographed image being used as a source image.

In this example, the mountain is a main subject. As indicated by a broken line 61, a "triangle", which is the shape of the mountain, is determined to be the characteristic shape of the subject image. Incidentally, the characteristic shape of the background image is not discriminable. In the stained glass conversion, the characteristic shape of the subject image is reflected. As a result, as shown in FIG. 12, a stained glass-style image, in which the subject image is represented by a triangular small piece 62, is obtained. In addition, the characteristic shape of the subject image is also reflected on the frame image, and a triangular frame material 63 is used.

CONCRETE EXAMPLE 3

Figure 13:
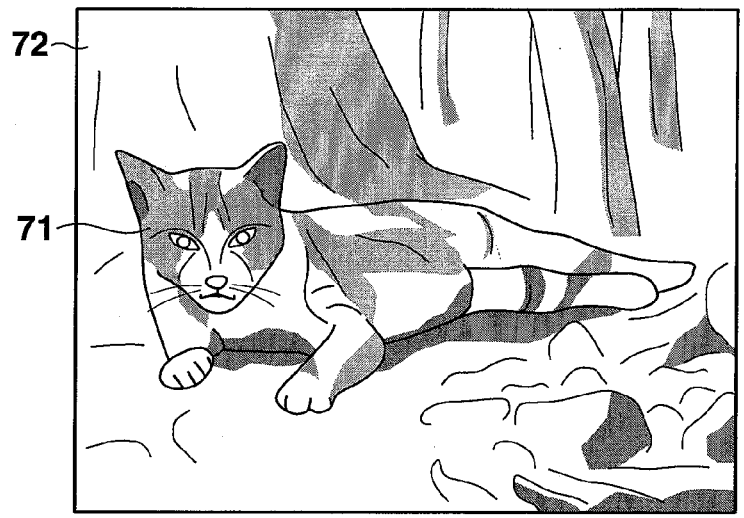
FIG. 13 is a view showing an example of another photographed image in the embodiment.
Figure 14:
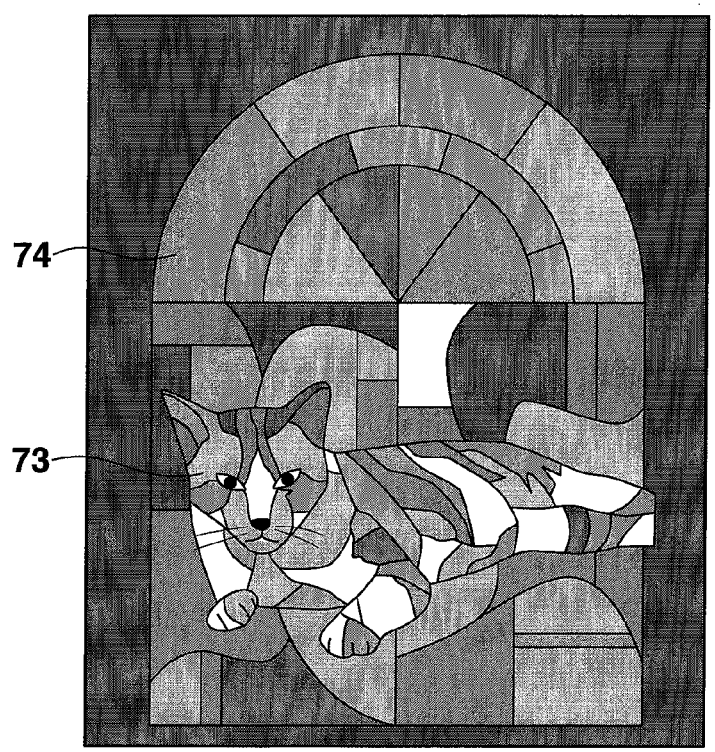
FIG. 14 is a view showing an example of another stained glass conversion image in the embodiment, which is obtained by subjecting the photographed image of FIG. 13 to stained glass conversion.

FIG. 13 is a view showing an example of a photographed image of another cat, and FIG. 14 is a view showing an example of an image which is obtained by stained glass conversion, with the photographed image being used as a source image.

In this example, the cat is a main subject, and stained glass conversion is executed by cutting out a subject image 71 of the cat. Incidentally, it is assumed that the characteristic shape of the background image was not discriminable. In the stained glass conversion, as shown in FIG. 14, a conversion image 73, in which the subject image 71 is finely divided into small pieces, is obtained.

Since the background image 72 could not be converted, a sample 74 of the background image, which was prepared in advance, is used. This example shows a case without a decorated frame.

In connection with the above-described concrete example 3, the procedure of stained glass conversion is described.

Figure 15:
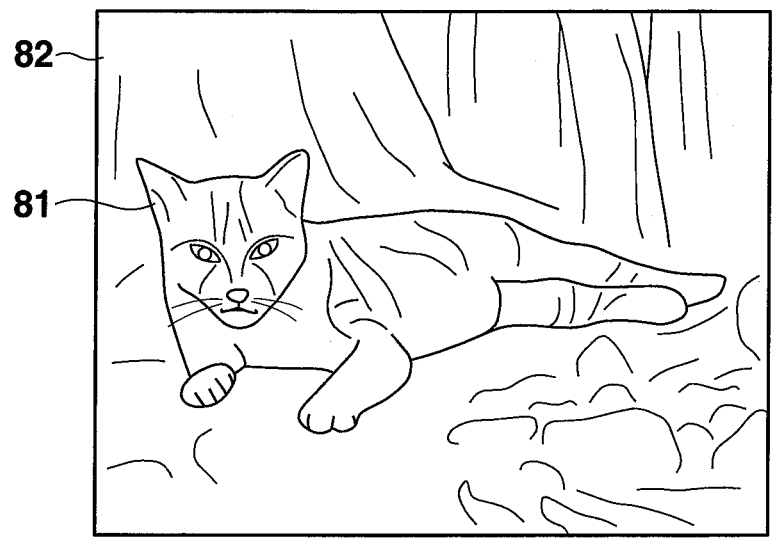
FIG. 15 is a view for describing line drawing conversion in the embodiment.

To start with, the source image is separated into the subject image 71 and background image 72, and each image is subjected to line drawing conversion. FIG. 15 shows a line drawing conversion result. In FIG. 15, numeral 81 denotes a line drawing corresponding to the subject image 71, and 82 denotes a line drawing corresponding to the background image 72.

Figure 16:
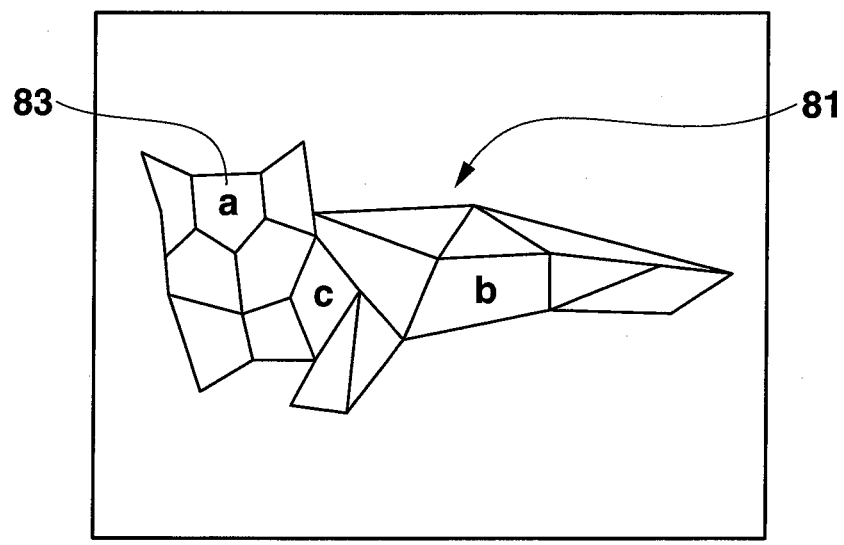
FIG. 16 is a view for describing divisional images in the embodiment.

Next, as shown in FIG. 16, in connection with the subject image 71, a plurality of divisional images 82 having geometrical shapes are formed by connecting the lines constituting the line drawing 81. These divisional images 82 correspond to a plurality of small pieces which constitute a stained glass, and a stained glass-style image can be obtained by coloring these small pieces in transparent colors corresponding to the colors of the subject image 71 that is the source image.

For example, by using a 24-color palette, the user may designate arbitrary colors in such a manner that a blue transparent color is for a part "a", a red transparent color is for a part "b", and a green transparent color is for a part "c".

Figure 17:
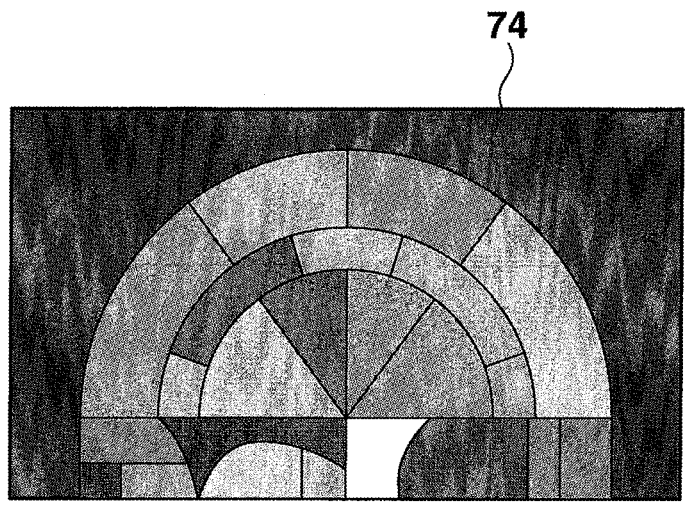
FIG. 17 is a view showing an example of a sample of a background image in the embodiment.

The same applies to the background image 72. However, in this example, since the line drawing 82 corresponding to the background image 72 is too fine, it is determined that stained glass conversion is difficult. In such a case, a composite process is executed by using the sample 74 of the background image, as shown in FIG. 17, and at last the stained glass-style image as shown in FIG. 14 is created.

As described above, the source image is separated into the subject image and the background image, and these images are subjected to stained glass conversion. The subject image and background image after the conversion are combined with the frame image that is separately prepared. Thereby, a single stained glass-style image is created. In this case, the source image that is the target of conversion may be any kind of image in which a subject is discriminably shown. Thus, by using, for example, a user's favorite photo, a stained glass-style image can be created, and the user can use the stained glass-style image, for example, by attaching it to a window, etc.

In the meantime, in the stained glass conversion, a color scheme may be considered under such a condition that the morning sunlight or evening glow passes through the stained glass-style image. Thereby, an interest of the stained glass-style image can be enhanced when the morning sunlight or evening glow is reproduced, based on time, by using a backlight, etc.

In addition, the color scheme may be varied in accordance with the disposition of the image, by inputting in advance, as a parameter, a northward disposition, a southward disposition, an eastward disposition or a westward disposition.

The image processing apparatus of the present invention is applicable to any kind of electronic equipment which handles image data, such as a personal computer, a mobile terminal device, or a digital camera.

In short, the present invention is not limited to the above-described embodiments. In practice, various modifications may be made without departing from the spirit of the invention. In addition, the functions, which are executed in the embodiments, may be properly combined as much as possible and implemented. The above-described embodiments include inventions in various stages, and various inventions can be derived from proper combinations of structural elements disclosed herein. For example, even if some structural elements in all the structural elements disclosed in the embodiments are omitted, if advantageous effects are obtained, the structure without such structural elements can be derived as an invention.

What is claimed is:

1. An image processing apparatus comprising:
   a CPU which is configured to:
     execute line drawing conversion of a source image;
     form a plurality of divisional images having geometrical shapes, by connecting lines of a line drawing obtained by the line drawing conversion;
     color, in colors, areas in the respective formed divisional images; and
     separate specific images including at least a main subject image from the source image,
   wherein the CPU is configured to execute line drawing conversion of the specific images separated from the source image.

2. The image processing apparatus of claim 1, wherein the CPU is configured to separate a main subject image and a background image excluding the subject image, as the specific images from the source image which is a target of conversion.

3. The image processing apparatus of claim 1, wherein the CPU is configured to color the respective formed divisional images, in colors corresponding to colors of the source image of the respective divisional images.

4. The image processing apparatus of claim 1, wherein the CPU is further configured to:
   determine characteristic shapes of the specific images which are separated from the source image, and
   process the lines of the line drawing, based on the characteristic shapes of the specific images.

5. The image processing apparatus of claim 4, wherein the CPU is further configured to select an arbitrary one of patterns of a plurality of kinds of characteristic shapes which are prepared in advance, when the characteristic shape of the specific image is indeterminable.

6. The image processing apparatus of claim 4, wherein the CPU is further configured to form a frame image composed of a plurality of frame materials, based on the determined characteristic shape of the specific image.

7. The image processing apparatus of claim 6, wherein the CPU is further configured to composite the specific image after coloring and the formed frame image.

8. The image processing apparatus of claim 6, wherein the CPU is further configured to:
   select an arbitrary one of a plurality of kinds of frame materials which are prepared in advance, when the characteristic shape of the specific image is indeterminable, and
   form a frame image by arranging the selected frame material in a preset frame area.

9. The image processing apparatus of claim 1, wherein the CPU is configured to separate the subject image and a background image from the source image as the specific images, and
   the CPU is further configured to composite the subject image and the background image after coloring.

10. The image processing apparatus of claim 9, wherein the CPU is further configured to:
    enlarge the subject image by a preset magnification, and
    superimpose the background image and the enlarged subject image, in an order of the background image and the subject image.

11. The image processing apparatus of claim 1, wherein the CPU is formed in a single control circuit,
    the image processing apparatus further comprises:
      a memory including a specific area for storing the source image which is acquired by the CPU from outside,
    the CPU is configured to execute line drawing conversion of the source image stored in the specific area of the memory, and
    the CPU is configured to store a colored image in an area other than the specific area of the memory.

12. A picture style conversion method for an image processing apparatus comprising a CPU, the method comprising performing, by the CPU:
    executing line drawing conversion of a source image;
    forming a plurality of divisional images having geometrical shapes, by connecting lines of a line drawing obtained by the line drawing conversion;
    coloring, in colors, areas in the respective formed divisional images; and
    separating specific images including at least a main subject image from the source image, wherein line drawing conversion of the specific images separated from the source image is executed.

13. A non-transitory computer-readable storage medium having stored thereon a computer program which is executable by a computer, the computer program controlling the computer to execute functions comprising:
   executing line drawing conversion of a source image;
   forming a plurality of divisional images having geometrical shapes, by connecting lines of a line drawing obtained by the line drawing conversion;
   coloring, in colors, areas in the respective formed divisional images; and
   separating specific images including at least a main subject image from the source image,
   wherein line drawing conversion of the specific images separated from the source image is executed.

14. An image processing apparatus comprising:
   a memory which stores a source image; and
   a CPU which is configured to:
      perform line drawing conversion of the source image;
      create geometrically-shaped divisional images by connecting lines of a line drawing obtained by the line drawing conversion;
      color the divisional images in specific colors;
      determine a specific image that includes a main subject image, from the source image; and
      perform line drawing conversion of the determined specific image.

* * * * *